Dec. 18, 1962 K. P. ALLEN Re. 25,302
METHOD OF FORMING A PAPER CUP
Original Filed May 7, 1958 2 Sheets-Sheet 1
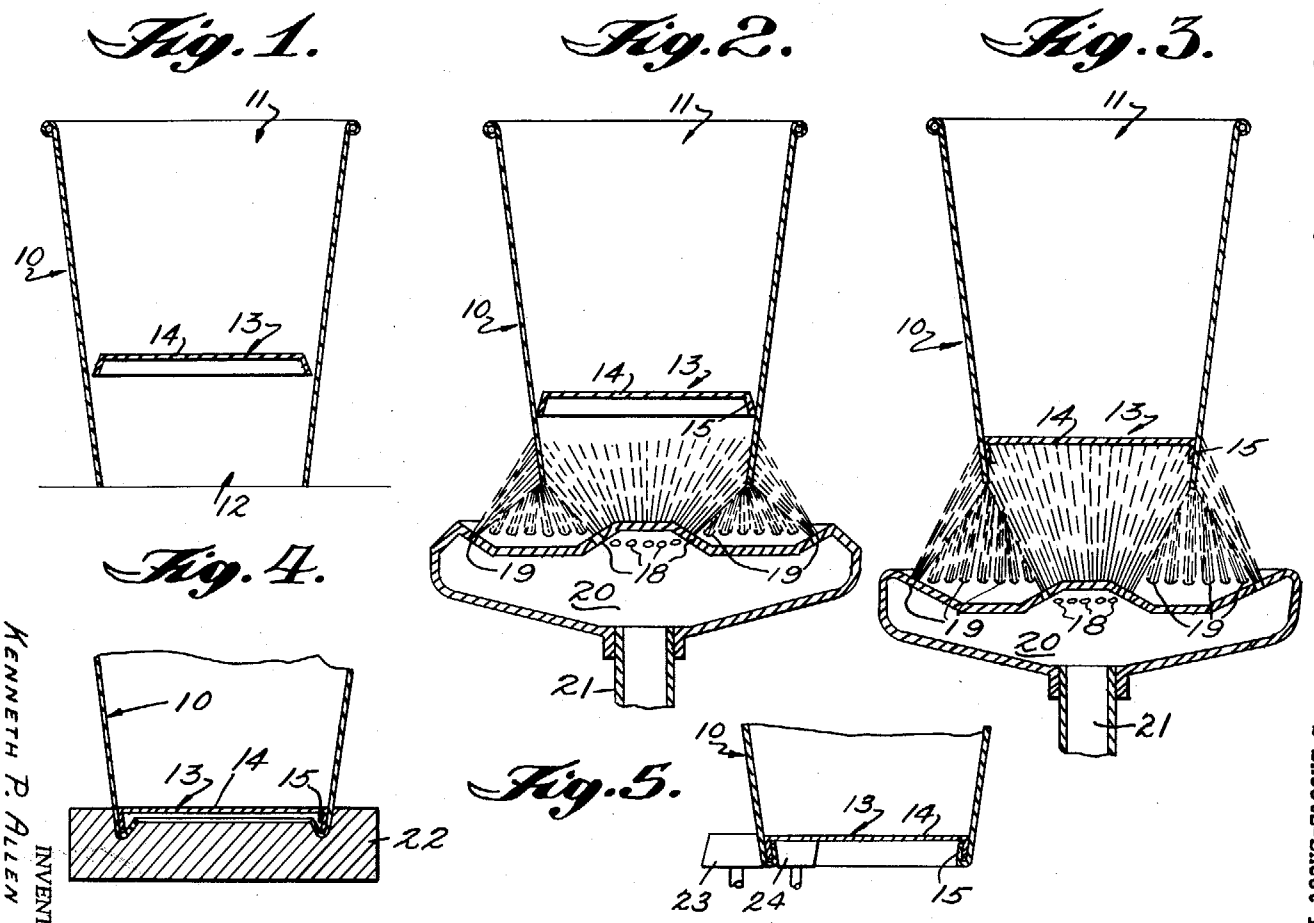
INVENTOR
KENNETH P. ALLEN
BY Robert P. Auber
George W. Raber
ATTORNEYS INVENTOR
KENNETH P. ALLEN
BY Robert P. Auber
George W. Reiber
ATTORNEYS United States Patent Office Re. 25,302
Reissued Dec. 18, 1962

25,302

METHOD OF FORMING A PAPER CUP

Kenneth P. Allen, Easton, Pa., assignor to American Can Company, New York, N.Y., a corporation of New Jersey Original No. 3,028,798, dated Apr. 10, 1962, Ser. No. 733,550, May 7, 1958. Application for reissue Apr. 24, 1962, Ser. No. 191,679
7 Claims. (Cl. 93—39.1)

Matter enclosed in heavy brackets [ ] appears in the original patent but forms no part of this reissue specification; matter printed in italics indicates the additions made by reissue.

The present invention pertains to a method of forming a paper cup and in particular, to the method of sealing the end closure or bottom of the cup to the side wall of the body.

The present invention can be used with paper cups having any transverse cross sectional shape, e.g. circular, triangular, square, polygonal, etc., any longitudinal cross-sectional shape, e.g. sides parallel, tapered inwardly towards the bottom, tapered outwardly towards the bottom, etc. While retaining these broad aspects of the instant invention, the invention will be described in relation to paper cups which are of the tapered type wherein the cross sectional dimensions at the bottom are smaller than the cross sectional dimensions at the top and in particular to paper cups having a frusto-conical shape wherein the cross-sectional diameter of the cup is least at the bottom thereof.

This construction and shape causes considerable difficulty in forming the conventional hemmed bottom edge seal of the cup because the hemming or sealing tool must be contractible in order to fit through the bottom of the cup wherein the cross-sectional dimension is least. The use of contractible and expansible tools, as has been done in the past, does not lend itself to accurate, high speed bottom sealing, especially when the bonding agent in the seal is a "hot-melt" or thermoplastic adhesive.

It is therefore an object of the present invention to provide a novel method of forming a heat seal between the body and end closure of a paper cup.

It is another object to provide a method of the character described wherein a thermoplastic adhesive on the end closure and adjacent body portions of a paper cup are heated in a novel manner.

Yet another object is to provide a method of forming a paper cup wherein a thermoplastic adhesive on the paper surfaces to be joined is heated to a tacky condition without physically contacting the surfaces with a heating tool.

Still a further object is to provide a method of the character described wherein a polyethylene coating on the inside of the body of a paper cup and on the end closure therefor acts as the adhesive for bonding the body and end closure together.

Another object is to provide a quick and efficient method of heating a thermoplastic adhesive on the body and end of a paper cup to render the adhesive soft and tacky.

A further object is to provide a method of the character described which is well suited to high speed, commercial production.

Numerous other objects and advantages of the invention will be apparent as it is better understood from the following description, which, taken in connection with the accompanying drawings, discloses a preferred embodiment thereof.

Referring to the drawings:

FIGURES 1 through 5 are side elevational views in section showing the sequency of steps in sealing an end closure to the body of a paper cup.

Figure 6:
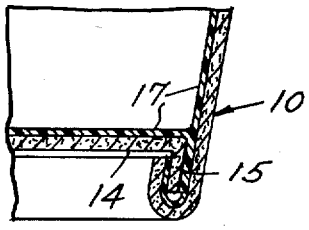
FIG. 6 is a fragmentary enlarged view in section showing an end seam formed by the steps illustrated in FIGS. 1 through 5.

The preferred or exemplary embodiment of the instant invention illustrated in the drawings shows a frusto-conical paper body 10 having a larger diameter end 11 and a smaller end 12. Disposed within the body 10 and spaced from end 12 is an end closure member generally designated 13 comprising a flat portion 14 extending transversely of the body 10 and a downturned peripheral flange 15 (FIG. 1). Although extending generally downwardly towards the smaller diameter end 12, the flange 15 also flares radially outwardly so as to make peripheral contact with the inside of the body 10. This flare of the flange 15 has been found advantageous in providing intimate contact between the outer surface of the flange 15 and the inner surface of the body 10 when the [closure] *end* 13 is in its lowermost position adjacent the end 12 and in minimizing the buckling of the closure 13 as it is lowered into position adjacent the smaller diameter end 12. On the interior surface of the body 10, on the surface of the portion 14 facing away from end 12 and on the surface of the flange 15 facing the side wall of body 10 is a coating of polyethylene 17 (FIG. 6).

With the body 10 and closure 13 maintained in the above described position, hot air ejected or blown through two series of orifices 18, 19 arranged concentrically in a head 20 is impinged against the inside and outside of the body 10 at its smaller diameter end 12. The jets blowing or emerging from the orifices 18 impinge against the inside of the body 10 whereas the jets coming from the orifices 19 strike against the outside of the cup body 10. The hot air is transmitted to the head 20 from a suitable source thereof (not shown) through a pipe or conduit 21. By virtue of the barrier presented by the radially outwardly flaring flange 15, the polyethylene coating on the upper side of flange 15 does not have any hot air impinged directly thereagainst. However, because of the proximity to the hot air jets and the generally heated atmosphere within the more or less enclosed space at the bottom of the cup, heat is transferred through the paper of the flange 15 to the polyethylene on the upper surface of the flange. The jets of hot air are impinged directly against both the inside and outside of body 10 to raise the polyethylene coating 17 to the desired temperature in a minimum of time. The impinged hot air acts to heat the polyethylene coating adjacent the end 12 of body 10 to at least a softened, if not tacky, state. It is to be understood that if a slower speed (although still relatively fast) operation could be tolerated, the air jets impinged against the outside of the body 10 could be dispensed with. In other words, it is essential only that the jets of hot air be impinged against the polyethylene coating 17 on the inside of the body 10.

After the polyethylene coating 17 on the body 10 has been brought to the desired heated or tacky condition, the closure 13 and body 10 are moved longitudinally relative to one another to position the closure 13 closer to or adjacent the smaller diameter end 12 (FIG. 3). In this position, the outer surface of the flange 15 is in contact with the heated polyethylene on the inside surface of the body 10; the portion 14 being spaced from the end 12 a distance approximately equal to twice the length of the flange 15. With the closure 13 thus positioned, jets of hot air are again directed towards the inside and outside surfaces of the body 10 contiguous its end 12 whereby the coating 17 on the body 10 is definitely heated to a tacky state. During this heating, the hot air is also directed against the uncoated side of the flange 15 thereby heating the polyethylene coating thereon, by heat transfer through the paper, to a softened, tacky condition. It is to be understood that the flow of hot air against the body 10 can be carried out continuously, including during the step of repositioning the closure 13 adjacent the smaller diameter end 12; or, the hot air impingement may be discontinued during the repositioning of closure 13 and thereafter recommenced after the closure is in its new position. Further, as with the initial impingement of hot air described above, impingement of the hot air against the outside of the body 10 may be omitted if desired.

While the polyethylene coating is in its heated, tacky state, the peripheral margin of the end 12 is folded inwardly around the peripheral flange 15 such as by a die 22 as shown in FIG. 4. Thereafter, the inturned peripheral margin is ironed flat against the adjacent portion of the body 10 with the flange 15 disposed therebetween. This operation may be accomplished by any suitable means, such as by a pair of opposed rollers 23, 24. By virtue of the tacky polyethylene on the inner surface of the body 10, and the outer surface of the flange 15 a strong, permanent, moisture-proof seal between the end closure 13 and the cup body 10 is effected. Further, because the polyethylene coating 17 extends over the entire inside surface of the body 10, and over the inside surface of the closure 13, and because there are no raw edges exposed on the inside of the cup, the paper in the finished cup as shown in FIG. 5 is completely protected from attack by liquids, both hot and cold. This protection makes the finished cup well suited as a drinking container for foods, such as hot coffee, hot soup, and the like.

Figure 7:
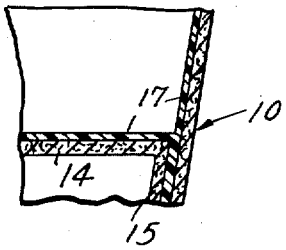
FIGS. 7 and 8 are fragmentary enlarged views in section similar to FIG. 6 but showing modified end seam constructions.

FIG. 7 illustrates a modification of the end seal. In this modification the lower extremity of the wall of body 10 remains straight and is not curled inwardly as is the body shown in FIG. 6. Also, in this modification, the downturned flange 15 is adhesively secured to the straight body wall continguous the end 12 with the periphery of the flange 15 exposed. The same operations shown in FIGS. 2, 3 and 5 are performed to produce a cup having this modified construction. The folding in operation shown in FIG. 4 is omitted since, in the modification shown in FIG. 7, the body wall is not turned inwardly.

Figure 8:
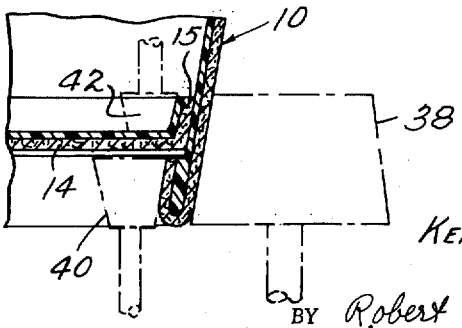

FIG. 8 illustrates another bottom seam modification. In this modification the lower margin of the body 10 is turned inwardly as with the body in FIG. 6 but the flange 15 extends upwardly rather than downwardly as shown in FIG. 6. The inturned margin of the body 10 forms, in effect, a circumferential shelf upon which the closure 13 rests. The operational steps to form this construction are the same as those shown in FIGS. 1 through 4 except that the flange 15 is turned upwardly instead of downwardly. Any suitable means may be used to iron the contiguous surfaces of the seam flat and form the necessary adhesive seals, such as (shown in dot-dash lines) the roller 25 contacting the outside of the cup and rollers 26, 27 contacting the curled peripheral margin and the flange 15 respectively. The roller 27 should be made of some heat resistant, non-adherent material such as Teflon so it will not stick to the heated polyethylene on the flange 15.

It is to be understood that materials other than polyethylene may be used as the adhesive in the instant invention. In general, any hot-melt adhesive is operable in the present invention if it reaches its activated state in a time and at a temperature which is non-destructive to the paper to which it is applied. Examples of other hot-melts are polypropylene, vinyl resins and polyamide resins. Other operable hot-melts and specific adhesive resins within these broad classes will be readily apparent to those skilled in the art.

It is readily apparent that the method of heating used in the instant invention involving jets of hot air effectively supplies heat to the polyethylene or other adhesive coating on the surfaces of the container to be bonded; and obviates the difficulty involved with the use of heated tools, such as dies and chucks. Because a mobile, fluid stream of hot air is used to supply the heat to the necessary parts of the container, heat sealing containers having irregular shapes or at least, shapes very difficult to reach with tools such as the narrow opening and tapered construction of the container described hereinbefore presents no problems. Further, impinging the hot air directly onto the surfaces to be heated raises these surfaces to the necessary temperature in a minimum amount of time, much more rapidly and economically than could be accomplished by other means, such as infrared heaters.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of joining a closure having a peripheral flange to a frusto-conically shaped body to form an open ended paper container comprising, [positioning] *supporting* said closure *in a stationary position* within and transversely of said body and spaced from the end thereof having the smaller diameter with said peripheral flange extending toward said smaller diameter end thereby forming a cavity-like hollow at said end, the inside surface of said body and the surface of said flange adjacent said inside surface having a polyethylene coating thereon, blowing hot air into said hollow and against the inside surface of said body adjacent said smaller diameter end and simultaneously therewith against the outside surface of said body adjacent said smaller diameter end *while said closure is in said stationary position* to soften said polyethylene coating on this portion of said body *and render it tacky,* moving said closure toward said smaller diameter end to a new position adjacent said smaller diameter end *while said softened polyethylene remains tacky and* thereby forming a cavity-like hollow at said end smaller than said first mentioned hollow, continuing the blowing of hot air into said smaller hollow and against said body and against said flange to [render] *maintain* the polyethylene thereon tacky and adhesive, and pressing said flange and contiguous body portions together with said tacky polyethylene disposed therebetween to join said closure to said body.

2. A method of joining a closure to a longitudinally tapered body adjacent the smaller end of said body to form an open ended paper container, said closure comprising a planar portion and a peripheral flange portion, comprising [positioning] *supporting* said closure *in a stationary position* within said body spaced from said smaller end with said planar portion extending transversely of said body and said flange portion being at an angle to said planar portion and to said body thereby forming a cavity-like hollow at said smaller end, the inside surface of said body contiguous said smaller end having a thermoplastic adhesive *while said closure is in said stationary position* thereon, blowing hot air into said hollow and against said adhesive to heat said adhesive *and render it tacky,* moving said closure toward said smaller end *while said heated adhesive remains tacky* to a new position adjacent said smaller end with said flange portion contiguous and in substantial parallelism with the inside surface of said body and with said heated adhesive disposed between said flange portion and said inside surface thereby forming a cavity-like hollow at said smaller end smaller than said first mentioned hollow, continuing the blowing of hot air into said smaller hollow and against said flange portion to [soften and tackify] *maintain* said adhesive soft and tacky, and pressing said flange portion and said body together with said softened tacky adhesive therebetween to firmly bond said closure to said body.

3. The method set forth in claim 2 wherein both the outside surface of said flange portion and the inside surface of said body have a thermoplastic adhesive thereon.

4. The method set forth in claim 2 wherein said hot air is blown against both the outside and inside of said body contiguous said one end thereof.

5. The method set forth in claim 2 wherein said body has a circular cross section.

*6. A method of joining a closure to a longitudinally tapered body adjacent the smaller end of said body to form an open ended paper container, said closure comprising a planar portion and a peripheral flange portion, said method comprising supporting said closure in a stationary position within said body and spaced from said smaller end with said planar portion extending transversely of said body and said flange portion being at an angle to said planar portion and to said body, the inside surface of said body contiguous said smaller end having a thermoplastic adhesive thereon, delivering a heating medium against said adhesive from a source out of contact with said adhesive, said closure and said body to heat said adhesive and render it tacky while said closure is in said stationary position, moving said closure and said body relative to one another while said adhesive is tacky to position said closure adjacent said smaller end with said flange portion contiguous and in substantial parallelism with the inside surface of said body and with said heated tacky adhesive disposed between said flange portion and said inside surface, and pressing said flange portion and said body together with said heated tacky adhesive therebetween to firmly bond said closure to said body.*

*7. A method of joining a closure having a peripheral flange to a frusto-conically shaped body to form an open ended paper container comprising, supporting said closure in a stationary position within and transversely of said body and spaced from the end thereof having the smaller diameter with said peripheral flange extending at an angle to said body thereby forming a first cavity-like hollow at said end, the inside surface of said body having a thermoplastic coating thereon, delivering a heating medium from a source out of contact with said adhesive, said closure and said body into said first hollow and directly against said thermoplastic adjacent said smaller diameter end which said closure is in said stationary position to heat said thermoplastic on this portion of said body and render it tacky, moving said closure while said adhesive is tacky toward said smaller diameter end to a new position adjacent said smaller diameter end thereby forming a second cavity-like hollow at said end smaller than said first hollow, and pressing said flange and contiguous body portions together with said heated tacky thermoplastic disposed therebetween to join said closure to said body.*

References Cited in the file of this patent or the original patent

UNITED STATES PATENTS

| | | |
|---|---|---|
| 1,796,075 | Blixt | Mar. 10, 1931 |
| 2,169,311 | Widell | Aug. 15, 1939 |
| 2,169,345 | Kuchler | Aug. 15, 1939 |
| 2,252,854 | Hubner | Aug. 19, 1941 |
| 2,259,256 | Maas et al. | Oct. 14, 1941 |
| 2,423,237 | Haslacher | July 1, 1947 |
| 2,453,644 | Steinkraus | Nov. 9, 1948 |
| 2,802,407 | Majer | Aug. 13, 1957 |
| 2,833,683 | Quandt | May 6, 1958 |
| 3,029,175 | Stenqvist | Apr. 10, 1962 |

FOREIGN PATENTS

| | | |
|---|---|---|
| 692,204 | Great Britain | June 3, 1953 |